Sept. 21, 1937. E. C. SAINT-JACQUES 2,093,469
EXHAUST MANIFOLD FOR INTERNAL COMBUSTION ENGINES
Filed Oct. 29, 1934
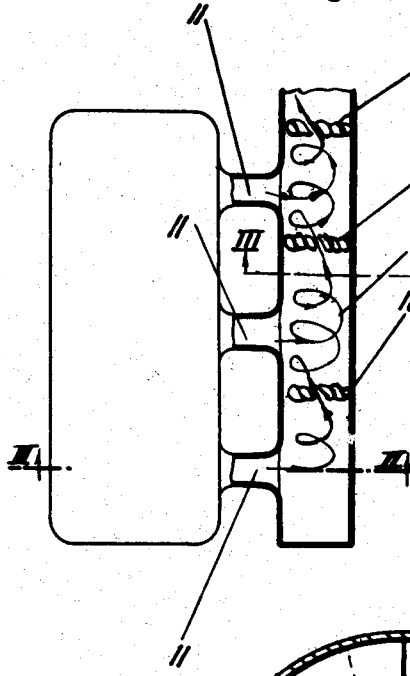
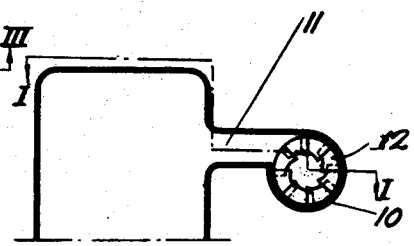
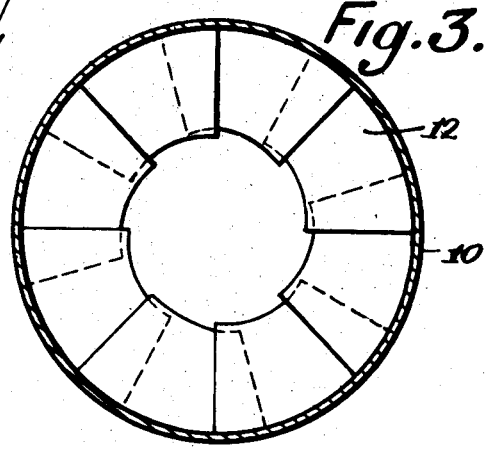
INVENTOR
Eugène Camille Saint-Jacques
by his attorneys Patented Sept. 21, 1937

2,093,469

UNITED STATES PATENT OFFICE 2,093,469

EXHAUST MANIFOLD FOR INTERNAL COMBUSTION ENGINES

Eugène Camille Saint-Jacques, Paris, France

Application October 29, 1934, Serial No. 750,424
In France January 30, 1934

2 Claims. (Cl. 181—58)

The present invention has as its subject an exhaust manifold for internal combustion engines permitting the removal of the exhaust gases to be regularized in order to suppress noise without loss of power.

To obtain these results it is proposed, according to the present invention, firstly to arrange the exhaust manifold so that the gases may take up a gyratory movement after their leaving the combustion chambers of the engine.

Up till now the exhaust ducts from the cylinders of the engine have been radially connected to the exhaust manifold so that the gases entered at the axis of this manifold and were sharply deviated towards the silencer; there resulted from this in particular a considerable loss of charge.

According to the present invention the said ducts are connected to the manifold so that the gases are admitted to this latter tangentially.

Inside the manifold there are moreover arranged, preferably between each cylinder and the adjacent cylinder, rings of vanes which direct the gases towards the axis of the manifold and give them a more regular spiral movement without retarding this movement of the gases but while suppressing the noise of the exhaust.

The attached drawing shows a non-limiting example of an embodiment of the invention.

Figure 1 is a view partly in plan and partly in section, the section portion being along the line I—I of Figure 2;

Figure 2 is a section along the line II—II of Figure 1; and

Figure 3 is an enlarged section along the line III—III of Figure 1 showing the ring of vanes.

In the drawing there is shown an exhaust manifold 10 to which the exhaust ducts 11 of the engine are connected tangentially. Rings of vanes 12 arranged so as to direct the gases towards the axis of the manifold without obstructing the spiral movement of the gases but while suppressing the noise of the exhaust are arranged in the manifold between each duct 11 and the next duct.

In these different rings of vanes 12 these vanes overlap and all have the same inclination so as to maintain a constant gyratory movement of the same direction for the gases introduced. There are thus not produced at any point of the device shocks which stop or slow or which change the direction of the gases. The movement of these is gyratory at the inlet into the exhaust chamber and it remains sufficient at the outlet into the surrounding air so that there will not be violent shocks.

Due to this arrangement, the noise of the exhaust is suppressed, a silent exhaust is produced but losses of charge affecting the yield of the engine are not observed.

It should be noted that the vanes 12 may readily be mounted in a rigid manner without the intervention of members which hinder the circulation of the gases and develop sound.

I claim:—

1. An exhaust manifold for an internal combustion engine, comprising a cylindrical casing open at one end and closed at the other, a tangential tube opening into said casing for the admission of exhaust gases from the cylinder of the engine, whereby the gases are given a spiral movement when entering the casing, and a ring comprising a plurality of helical vanes within the casing between the tangential tube and the open end of the casing, whereby the spiral movement of the gases is increased during the movement from the tangential tube toward the open end of the casing.

2. An exhaust manifold for a multi-cylinder internal combustion engine, comprising a cylindrical casing open at one end and closed at the other, a plurality of tangential tubes opening into said casing for the admission of exhaust gases from the cylinders of the engine, whereby the gases are given a spiral movement when entering the casing, a ring comprising a plurality of helical vanes within the casing between the first tangential tube and the open end of the casing, a similar ring of vanes in the casing between adjacent tangential tubes, whereby the spiral movement of the gases is increased during the movement from the tangential tubes toward the open end of the casing.

EUGÈNE CAMILLE SAINT-JACQUES.